US010352485B2

(12) United States Patent
Kim

(10) Patent No.: US 10,352,485 B2
(45) Date of Patent: Jul. 16, 2019

(54) PIPE CONNECTING DEVICE

(71) Applicant: Ki Nyeon Kim, Gwangmyeong-si (KR)

(72) Inventor: Ki Nyeon Kim, Gwangmyeong-si (KR)

(*) Notice: Subject to any disclaimer, the term of this patent is extended or adjusted under 35 U.S.C. 154(b) by 136 days.

(21) Appl. No.: 15/519,162

(22) PCT Filed: Oct. 26, 2015

(86) PCT No.: PCT/KR2015/010782
§ 371 (c)(1),
(2) Date: Apr. 14, 2017

(87) PCT Pub. No.: WO2016/068519
PCT Pub. Date: May 6, 2016

(65) Prior Publication Data
US 2017/0241578 A1 Aug. 24, 2017

(30) Foreign Application Priority Data
Oct. 31, 2014 (KR) .................. 10-2014-0150560

(51) Int. Cl.
*F16L 19/02* (2006.01)
*F16L 25/12* (2006.01)
*F16L 19/00* (2006.01)
(52) U.S. Cl.
CPC ......... *F16L 19/0218* (2013.01); *F16L 19/005* (2013.01); *F16L 19/0237* (2013.01); *F16L 25/12* (2013.01)
(58) Field of Classification Search
CPC ..... F16L 19/005; F16L 19/02; F16L 19/0231; F16L 19/025
USPC .... 285/340, 386, 387, 388, 389, 89, 92, 383
See application file for complete search history.

(56) References Cited

U.S. PATENT DOCUMENTS

| 1,089,650 | A | * | 3/1914 | Kile ...................... F16L 19/005 285/245 |
| 2,390,103 | A | * | 12/1945 | Johnson ................ F16L 19/005 285/116 |
| 2,441,344 | A | * | 5/1948 | Bosworth ............. F16L 19/028 285/321 |

(Continued)

FOREIGN PATENT DOCUMENTS

| JP | 07-158781 A | 6/1995 |
| KR | 10-2005-0064128 A | 6/2005 |

(Continued)

OTHER PUBLICATIONS

International Search Report for PCT/KR2015/010782 dated Jan. 11, 2016 from Korean Intellectual Property Office.

*Primary Examiner* — Aaron M Dunwoody
(74) *Attorney, Agent, or Firm* — Revolution IP, PLLC

(57) ABSTRACT

A pipe connecting device configured to connect at least two pipes, comprises a pipe including a catching ledge at a connecting end portion thereof and made of stainless steel or copper; a first connecting member formed in a cylindrical shape and having a spring seating portion on which a circular plate spring is seated, a pipe through-hole through which the pipe passes, and a screw recess provided inside the first connecting member; and a second connecting member provided with an o-ring seating portion on which an o-ring is seated at a side at which the pipe is coupled and an outer surface having a screw thread, wherein a through-portion having the same inner diameter as the pipe is formed in the second connecting member.

4 Claims, 3 Drawing Sheets

(56) References Cited

U.S. PATENT DOCUMENTS

| | | | | |
|---|---|---|---|---|
| 2,767,564 A * | 10/1956 | Green | ..................... | B23B 31/08 |
| | | | | 279/141 |
| 3,847,421 A * | 11/1974 | Eschbaugh | ......... | F16L 19/0283 |
| | | | | 285/353 |
| 4,842,309 A * | 6/1989 | LaVene | ............... | F16L 37/0842 |
| | | | | 285/319 |
| 5,340,163 A * | 8/1994 | Merrer | .................. | F16L 19/005 |
| | | | | 285/334.4 |
| 5,344,195 A * | 9/1994 | Parimore, Jr. | ...... | F16L 19/0231 |
| | | | | 285/340 |
| 8,303,001 B2 * | 11/2012 | Oh | ..................... | F16L 25/0045 |
| | | | | 285/340 |
| 2010/0201124 A1 * | 8/2010 | Duquette | ............. | F16L 19/025 |
| | | | | 285/382.7 |
| 2014/0132001 A1 * | 5/2014 | Stahl | .................... | F16L 19/005 |
| | | | | 285/390 |
| 2017/0314336 A1 * | 11/2017 | Johnson | ................ | E21B 17/042 |
| 2017/0350357 A1 * | 12/2017 | Touchette | ............. | F16L 19/025 |

FOREIGN PATENT DOCUMENTS

| | | |
|---|---|---|
| KR | 10-0626291 B1 | 9/2006 |
| KR | 10-0756429 B1 | 9/2007 |
| KR | 10-2010-0056736 A | 5/2010 |
| KR | 20-2011-0011340 U | 12/2011 |

\* cited by examiner

PIPE CONNECTING DEVICE

CROSS REFERENCE TO PRIOR APPLICATIONS

This application is a National Stage Application of PCT International Patent Application No. PCT/KR2015/010782 filed on Oct. 26, 2015, under 35 U.S.C. § 371, which claims priority to Korean Patent Application No. 10-2014-0150560 filed on Oct. 31, 2014, which are all hereby incorporated by reference in their entirety.

TECHNICAL FIELD

The present invention relates to a pipe connecting device configured to connect a plurality of pipes, and more particularly, to a pipe connecting device configured to connect pipes with a relatively simple structure thereof and improve reliability of pipe connecting portions.

BACKGROUND ART

Generally, pipes used for transporting a fluid such as water, an oil, or a gas over a long distance have limited lengths, and thus flanges are formed at connecting portions to continuously connect the pipes and the flanges are connected to each other using connecting members. In addition, various methods such as a method in which connecting portions are welded, an expansion molding method, and a compression method are applied. When pipes are connected by welding, a specialized welder is needed and thermal deformation may occur during the work. In addition, in the case of an expansion molding method in which a packing is inserted between two bodies of pipes which are connected to each other, a nut is tightened to compress the packing, and a bolt is inserted into a plumbing pipe to prevent the pipes from being separated, there is a problem in that pipe deformation occurs and thus sediment is deposited in the pipe. In addition, in the case of a compression method in which a pipe is inserted into a connecting member and a packing is pressurized together with a stainless steel ring using a separate compressing tool, there is a problem in that pipe deformation occurs.

Although a pipe connecting structure including both pipes in which a plurality of recessed portions are formed at positions at which corresponding pipes are connected in a circumferential direction, a joint ring in which a plurality of protruding portions inserted into the recessed portions of both of the pipes are formed to connect both of the pipes and a packing member inserted into the joint ring to seal between the both pipes is disclosed in Korean Patent Publication No. 10-0626291, the pipes are deformed, and it is difficult to constantly maintain a fluid flow flowing through the pipes due to the recessed portions. In addition, when sediment is deposited in the recessed portions and the pipe is left alone for a long time, there is a problem in that a blocking phenomenon may occur.

DISCLOSURE

Technical Problem

The present invention is directed to providing a pipe connecting device capable of preventing pipe deformation, easily connecting pipes with a relatively simple structure thereof by even an inexperienced technician, and improving reliability of pipe connecting portions.

Technical Solution

One aspect of the present invention provides a pipe connecting device including a pipe having a catching ledge at a connecting end portion thereof, a first connecting member formed in a cylindrical shape and having a spring seating portion on which a circular plate spring is seated, a pipe through-hole through which the pipe passes, and a screw recess provided inside the first connecting member, and a second connecting member provided with an o-ring seating portion on which an o-ring is seated at a side at which the pipe is coupled and an outer surface having a screw thread, wherein a through-portion having the same inner diameter as the pipe is formed in second connecting member, and the pipe is made of stainless steel or copper.

Another aspect of the present invention provides a first connecting member coupling portion is provided at the first connecting member and is coupled to one side of the second connecting member, and a fixing member configured to couple the first connecting member coupling portion to another first connecting member coupling portion provided at another first connecting member and coupled to the other side facing the one side.

Still another aspect of the present invention provides a first connecting member coupling portion is provided at the first connecting member and is coupled to one side of the second connecting member, and a fixing member configured to couple the first connecting member coupling portion to another first connecting member coupling portion provided at another first connecting member and coupled to the other side facing the one side. In addition, the first connecting member coupling portion may be provided at the first connecting member, and an auxiliary fixing member coupled to a second connecting member coupling portion provided at the second connecting member may be provided.

Advantageous Effects

As described above, a pipe connecting device according to the present invention has effects in that a pipe is not deformed, even an inexperienced technician can easily connect pipes with a relatively simple structure thereof, and reliability of pipe connecting portions can be improved, particularly, pipe deformation due to a connecting structure of a pipe formed with a thin plate, which is made of stainless steel or copper and in which deformation easily occurs and a difference between inner and outer diameters thereof is relatively small, is fundamentally prevented, a speed and an amount of a fluid flowing in the pipe can be constantly maintained, and the pipes can be easily connected at a site without a working place for connecting the pipes and a separate tool.

DESCRIPTION OF DRAWINGS

FIG. 7 is a cross-sectional view illustrating a pipe connecting device according a third embodiment of the present invention.

MODES OF THE INVENTION

Figure 1:
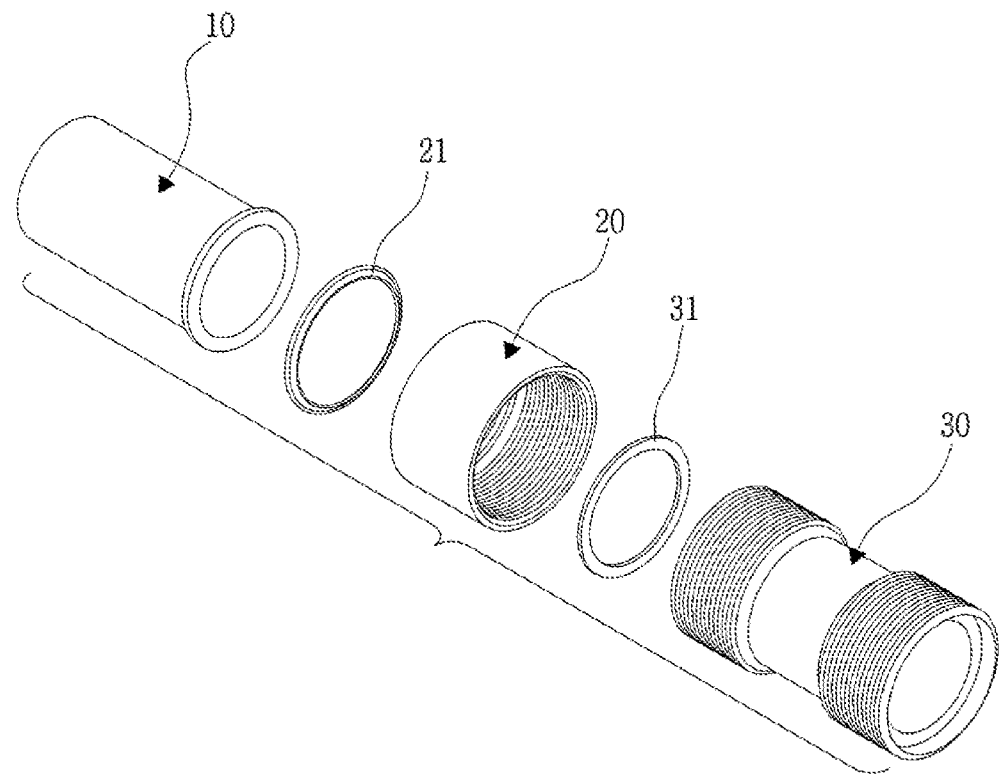
FIG. 1 is a cross-sectional view illustrating an entire conventional pipe connecting structure.
Figure 2:
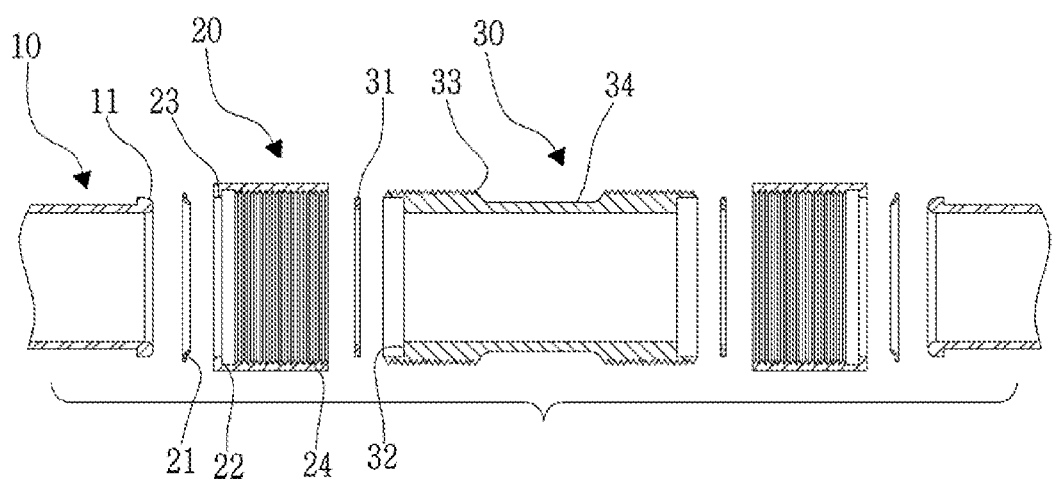
FIG. 2 is an exploded perspective view illustrating a pipe connecting device according to the present invention.

Components of the present invention will be described with reference to FIGS. 2 and 3 which respectively are exploded perspective and cross-sectional views illustrating a pipe connecting device according to the present invention. The pipe connecting device configured to connect at least two pipes includes: a pipe 10 having a catching ledge 11 at a connecting end portion thereof; a first connecting member 20 formed in a cylindrical shape and having a spring seating portion 22 on which a circular plate spring 21 is seated, a pipe through-hole 23 through which the pipe 10 passes, and screw recesses 24 provided thereinside; and a second connecting member 30 provided with an o-ring seating portion 32 on which an o-ring 31 is seated at a side at which the pipe 10 is coupled and an outer surface having screw threads 33, wherein a through-portion 34 having the same inner diameter as the pipe 10 is formed in the second connecting member 30.

Figure 3:
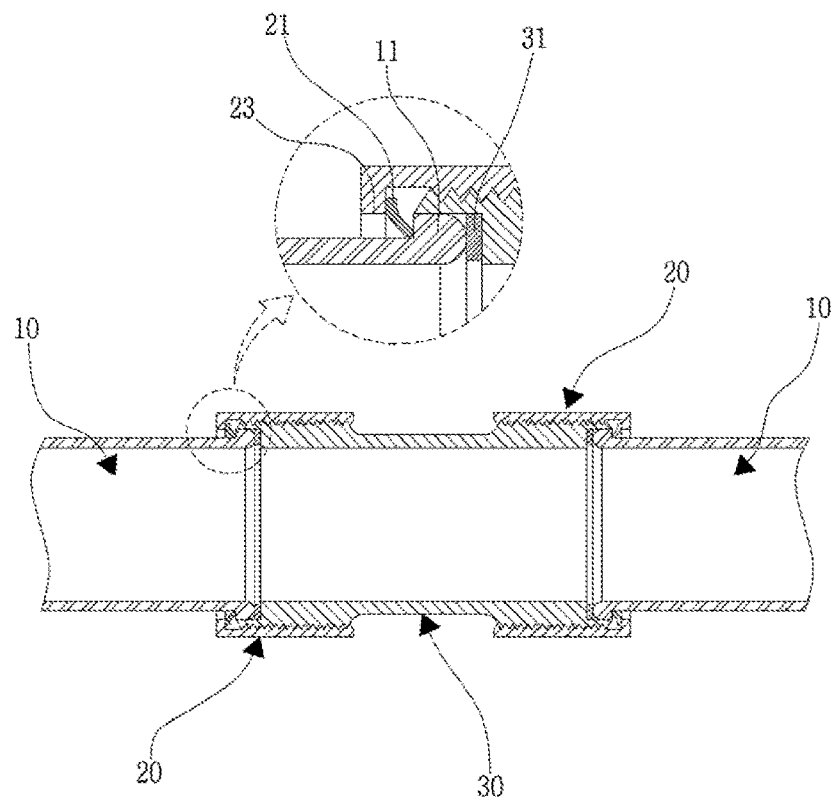
FIG. 3 is an exploded cross-sectional view illustrating the pipe connecting device according to the present invention.

Referring to FIG. 3 which is a cross-sectional view illustrating the pipe connecting device according to the present invention, a coupling method of the pipe connecting device having the above components and a coupling relation of the components will be described. In a first step, when the plate spring 21 is inserted into the spring seating portion 22 provided at the first connecting member 20 and the pipe 10 is connected thereto, the catching ledge 11 is hooked on the plate spring 21 and prevents the pipe from being separated in a direction opposite a direction at which the pipe is coupled to the first connecting member 20. In a second step, the o-ring 31 made of rubber is inserted into the o-ring seating portion 32 provided in the second connecting member 30, and the screw recess 24 is coupled to the screw thread 33 to couple the first connecting member 20 to the second connecting member 30. Here, since the catching ledge 11 provided at the pipe 10 compresses the o-ring 31 and is coupled to the o-ring 31, fluid leakage can be prevented. Another pipe 10 is coupled using the above-described method at a side opposite a side at which the pipe 10 is coupled to the second connecting member 30 to completely couple the two pipes. Particularly, when the pipe 10 is made of stainless steel or copper and has a diameter of 5 to 50 mm, the pipe 10 is relatively easily deformed, and thus when the above-described pipe connecting device is applied, there are effects in that deformation of the pipe 10 can be prevented and coupling portions can be reinforced.

Figure 4:
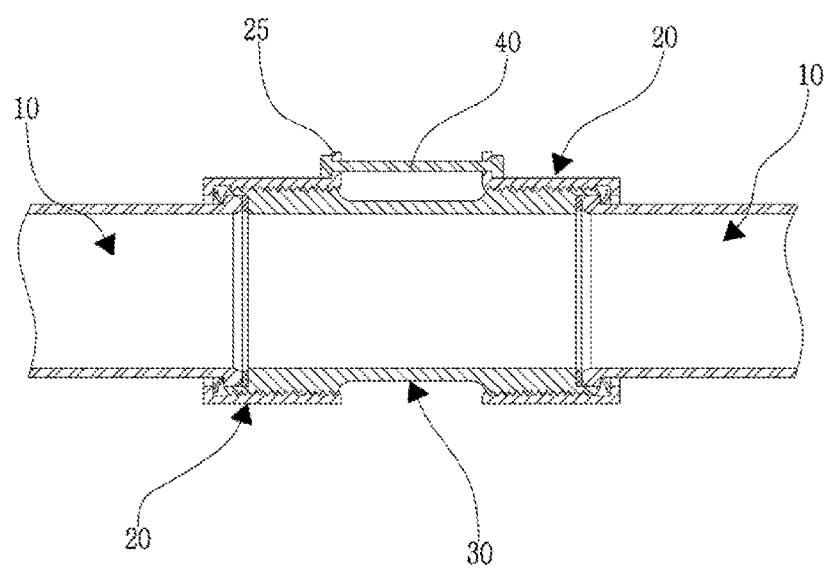
FIG. 4 is a cross-sectional view illustrating the pipe connecting device according to the present invention.

Referring to FIG. 4 which is a cross-sectional view illustrating a pipe connecting device according to a first embodiment of the present invention, a first connecting member coupling portion 25 is further provided at the first connecting member 20 and is coupled to one side of the second connecting member 30, and a fixing member 40 configured to couple the first connecting member coupling portion 25 to another first connecting member coupling portion 25 provided at another first connecting member 20 and coupled to the other side facing the one side is further provided to prevent the screw from being released due to vibrations and external forces when pipes coupled in a screw-coupling method are left alone for a long time.

Figure 5:
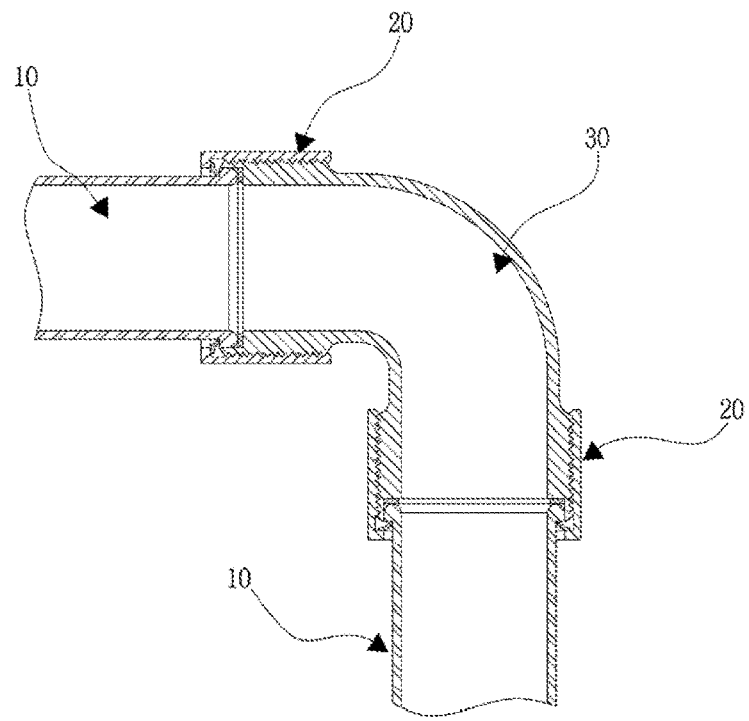
FIG. 5 is a cross-sectional view illustrating a pipe connecting device according to a first embodiment of the present invention.

FIG. 5 is a cross-sectional view illustrating a pipe connecting device according to a second embodiment of the present invention. When the pipes 10 are connected in a "ㄱ" shape and a body of the second connecting member 30 is provided in the "ㄱ" shape, the "ㄱ" shape may be equally applied to other components.

Figure 6:
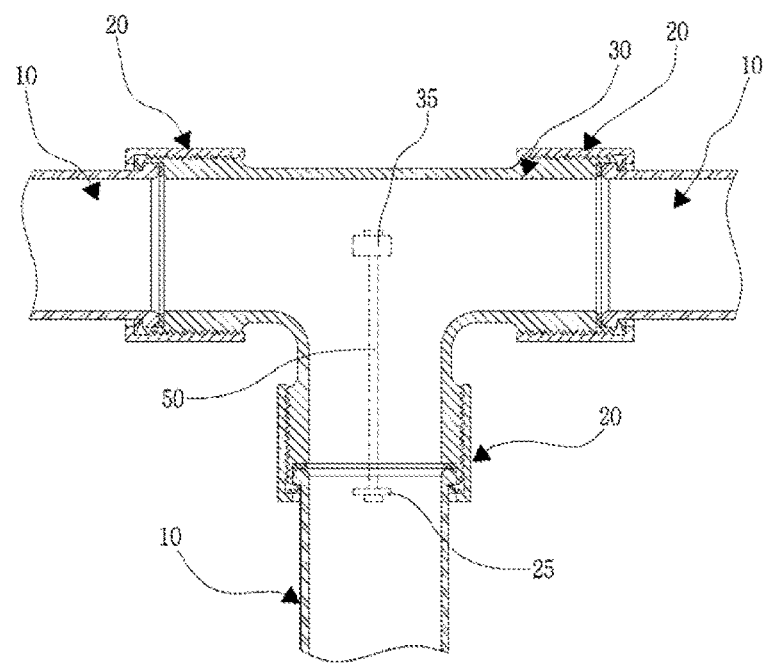
FIG. 6 is a cross-sectional view illustrating a pipe connecting device according to a second embodiment of the present invention.

FIG. 6 is a cross-sectional view illustrating a pipe connecting device according a third embodiment of the present invention. When three pipes 10 are connected in a "T" shape and a body of the second connecting member 30 is provided in the "T" shape, the "T" shape may be equally applied to other components. In addition, the first connecting member coupling portion 25 is provided at the first connecting member 20, and an auxiliary fixing member 50 coupled to a second connecting member coupling portion 35 provided at the second connecting member 30 may be provided to more strongly couple the pipes.

While the present invention has been illustrated and described above with reference to the specific embodiments and application examples, it may be easily understood by those skilled in the art that various modifications and alterations may be made without departing from the spirit and scope of the present invention described in the appended claims.

The invention claimed is:

1. A pipe connecting device configured to connect at least two pipes, comprising:
    a pipe (10) including a catching ledge (11) disposed at one end of the pipe;
    a first connecting member (20) formed in a cylindrical shape and having a spring seating portion (22) on which a circular plate spring (21) is seated, a pipe through-hole (23) through which the pipe (10) passes, and a screw recess (24) provided inside the first connecting member (20); and
    a second connecting member (30) provided with an o-ring seating portion (32) on which an o-ring (31) is seated at one end of the second connecting member (30) to which the one end of pipe (10) is opposite and an outer surface having a screw thread (33), the second connecting member (30) having the same inner diameter as the pipe (10),
    wherein the two pipes are connected in a distance by coupling between the first and second connecting members (20, 30) without contact between the pipes, and
    wherein the catching ledge (11) of the pipe (10) is positioned between one end of the first connecting member (20) and the one end of the second connecting member (30), and a catching ledge of other pipe is positioned between the other end of the first connecting member (20) and the other end of the second connecting member (30).

2. The pipe connecting device of claim 1, wherein:
    a first connecting member coupling portion (25) is provided at the first connecting member (20) and coupled to one side of the second connecting member (30); and
    a fixing member (40) configured to couple the first connecting member coupling portion (25) to another first connecting member coupling portion (25) provided at another first connecting member (20) and coupled to the other side facing the one side.

3. The pipe connecting device of claim 1, wherein:
    a first connecting member coupling portion (25) is provided at the first connecting member (20); and an auxiliary fixing member (50) coupled to a second connecting member coupling portion (35) provided at the second connecting member (30) is provided.

4. The pipe connecting device of claim 1, wherein the circular plate spring (21) is positioned between the spring seating portion (22) and the catching ledge (11) to prevent the pipe (10) from being disengaged from the first connecting member (20).

* * * * *